United States Patent
Mukae et al.

(10) Patent No.: US 8,471,169 B2
(45) Date of Patent: Jun. 25, 2013

(54) ELECTRODE FOR SPOT WELDING

(75) Inventors: Shingo Mukae, Fukuoka (JP); Kenji Okamura, Fukuoka (JP); Shuichi Teramoto, Fukuoka (JP); Jun Kurobe, Hyogo (JP); Hiroshi Asada, Hyogo (JP); Shouji Inoue, Hyogo (JP); Shigeo Matsubara, Tokyo (JP)

(73) Assignees: Nippon Tungsten Co., Ltd., Fukuoka (JP); Nisshin Steel Co., Ltd., Tokyo (JP)

( * ) Notice: Subject to any disclaimer, the term of this patent is extended or adjusted under 35 U.S.C. 154(b) by 1184 days.

(21) Appl. No.: 12/308,088

(22) PCT Filed: Jun. 6, 2007

(86) PCT No.: PCT/JP2007/061432
§ 371 (c)(1),
(2), (4) Date: Dec. 5, 2008

(87) PCT Pub. No.: WO2007/142257
PCT Pub. Date: Dec. 13, 2007

(65) Prior Publication Data
US 2010/0193478 A1 Aug. 5, 2010

(30) Foreign Application Priority Data
Jun. 8, 2006 (JP) .................................. 2006-159318

(51) Int. Cl.
*B23K 11/11* (2006.01)
*B23K 35/22* (2006.01)
(52) U.S. Cl.
USPC ........... 219/86.1; 219/119; 219/118; 148/423
(58) Field of Classification Search
USPC ..... 419/10, 12, 13, 19, 23; 148/423; 428/546, 428/561; 219/86.1, 119, 12, 13
See application file for complete search history.

(56) References Cited

U.S. PATENT DOCUMENTS 1,330,563 A * 2/1920 Weed ............................ 219/120
4,045,644 A * 8/1977 Shafer et al. ................... 219/119

(Continued)

FOREIGN PATENT DOCUMENTS

JP 54-049944 4/1979
JP 01-113182 5/1989

(Continued)

OTHER PUBLICATIONS

Supplementary European Search Report (in English language) issued Mar. 15, 2010 in corresponding European Patent Application No. 07 74 4775.

*Primary Examiner* — Joseph M Pelham
*Assistant Examiner* — Jimmy Chou
(74) *Attorney, Agent, or Firm* — Wenderoth, Lind & Ponack, L.L.P.

(57) ABSTRACT

Provided is an electrode (1) which has a double structure including Cu or a Cu alloy as an electrode body (2) and a core material (3) made of W, Mo, a W-based alloy, or a Mo-based alloy embedded in a surface of the electrode body (2) which is abutted against a material to be welded, the core material (3) being formed by using W, Mo, the W-based alloy, or the Mo-based alloy which is in the form of a fibrous structure extended by sintering, swaging, and annealing in an electrode axis direction, the fibrous structure having a horizontal cross-sectional average particle diameter of 50 μm or more and an aspect ratio of 1.5 or more. The electrode (1) can be used as an inexpensive electrode obtained by suppressing particle dropping/attrition and defects in electrodes for spot welding, in which heat and pressure are applied repeatedly, stably enhancing durability.

7 Claims, 2 Drawing Sheets

U.S. PATENT DOCUMENTS

| | | | |
|---|---|---|---|
| 4,370,299 A * | 1/1983 | Morozumi | 420/429 |
| 4,673,796 A * | 6/1987 | Kiilunen | 219/145.22 |
| 4,728,765 A * | 3/1988 | Prucher | 219/120 |
| 4,843,206 A * | 6/1989 | Azuma et al. | 219/119 |
| 4,916,030 A * | 4/1990 | Christodoulou et al. | 428/614 |
| 5,611,945 A * | 3/1997 | Kuwabara et al. | 219/119 |
| 5,844,194 A * | 12/1998 | Kuwabara et al. | 219/119 |
| 6,130,399 A * | 10/2000 | Lu et al. | 219/121.59 |
| 6,428,631 B1 * | 8/2002 | Tomokiyo et al. | 148/306 |
| 6,562,290 B2 * | 5/2003 | Meinhardt et al. | 419/35 |
| 6,583,378 B1 * | 6/2003 | Yamaguchi et al. | 219/121.52 |
| 6,589,368 B1 * | 7/2003 | Takada et al. | 148/317 |
| 6,858,060 B2 * | 2/2005 | Meinhardt et al. | 75/359 |
| 7,429,302 B2 * | 9/2008 | Hirasawa et al. | 148/325 |
| 7,538,294 B2 * | 5/2009 | Scotchmer | 219/119 |
| 2004/0013557 A1 * | 1/2004 | Morris | 419/36 |
| 2005/0092728 A1 * | 5/2005 | Barbeau et al. | 219/229 |
| 2006/0048866 A1 * | 3/2006 | Takada et al. | 148/423 |
| 2007/0056777 A1 * | 3/2007 | Overstreet | 175/433 |
| 2008/0202288 A1 * | 8/2008 | McKechnie et al. | 75/346 |

FOREIGN PATENT DOCUMENTS

| | | |
|---|---|---|
| JP | 02-117780 | 5/1990 |
| JP | 04-004984 | 1/1992 |
| JP | 05-220581 | 8/1993 |
| JP | 05-318139 | 12/1993 |
| JP | 2004-353011 | 12/2004 |
| JP | 2005-111483 | 4/2005 |
| JP | 2006-15349 | 1/2006 |
| JP | 2006-95549 | 4/2006 |
| JP | 2006-102775 | 4/2006 |
| WO | 2006/004073 | 1/2006 |

* cited by examiner

ELECTRODE FOR SPOT WELDING

TECHNICAL FIELD

The present invention relates to an electrode for resistance welding which has a double structure including W, Mo, a W-based alloy, or a Mo-based alloy as a core material embedded in a ambient material made of Cu or a Cu alloy.

BACKGROUND ART

In assembly lines for automobiles, home electric appliances, and the like, spot welding methods, which have high working efficiency among resistance welding methods, are widely employed. In a mass production line, continuous spot welding is carried out. An electrode for continuous spot welding is repeatedly exposed to high heat and high charge during use, so deformation thereof is likely to occur; therefore, excellent deformation resistance is required for an electrode raw material. The electrode raw material also needs to be excellent in electric conductivity, thermal conductivity, strength, and abrasion resistance, which are the inherently required properties of electrodes for spot welding. Accordingly, a Cu alloy such as a Cu—Cr alloy or a Cu—Cr—Zr alloy or a Cu material in which a hard substance such as $Al_2O_3$ is dispersed is used as the electrode raw material. Of those, Cu—Cr alloys are widely used from comprehensive viewpoints of thermal conductivity, strength, cost, and the like.

However, as a raw material for automobiles, home electric appliances, and the like, plated steel sheet plated with Zn, Zn alloy, or the like has been widely used in order to enhance durability of the raw material. The plated steel sheet is spot welded by being supplied with heavier current compared with current in spot welding of cold-drawn steel sheet; therefore, the distal end part of the electrode is exposed to further severe conditions.

At the distal end of the electrode during welding, an alloying reaction takes place between plated layer constituents such as Zn and Al, Fe which is a matrix constituent of plated steel sheet, and Cu which is a main constituent of electrodes, whereby intermetallic compounds such as Cu—Zn, Cu—Zn—Al—Fe, and the like are easily formed. The generated intermetallic compounds are so brittle that the intermetallic compounds are peeled off by the pressing at the time of welding. The phenomenon brings about an increase in diameter of the distal end of the electrode, which is a cause of lowered current density.

As a result, in the case of welding plated steel sheet, the lifetime of the electrode becomes shorter compared with the case where cold-drawn steel sheet such as ordinary steel or stainless steel is spot welded. The shorter lifetime of the electrode has a great adverse effect on the workability of spot welding, wherein the number of used electrodes is increasing.

Accordingly, the inventors of the present invention previously proposed an electrode for spot welding having a double structure including a core material embedded in the central part of the distal end of the electrode, aiming for a longer lifetime of the electrode.

An electrode for spot welding according to Patent Document 1 includes Cu or a Cu alloy as an electrode body and a core material made of W, Mo, a W-based alloy, or a Mo-based alloy embedded in an abutting surface, which is a surface of the electrode that abuts against a material to be welded, so the area ratio of the core material to the abutting surface is adjusted to the range of 0.7 to 3.0. In the core material, at least one kind of fine particles selected from an oxide, a nitride, a carbide, and a boride of a 2A group element, a 4A group element, a 5A group element, a 6A group element, or a rare earth element may be dispersed at a ratio of 0.5 to 10 volume %.

An electrode for spot welding according to Patent Document 2 is a double-structured electrode developed for subjecting a Mg-containing Zn-based alloy-plated steel sheet to spot welding, and the electrode includes, for a core material thereof, W, Mo, a W-based alloy, or a Mo-based alloy in which one kind or two or more kinds of fine particles selected from oxides of Be, Mg, Ca, Sr, Ti, Zr, Y, and Ce are dispersed at a ratio of 0.5 to 10 volume %.

An electrode for spot welding according to Patent Document 3 also includes, for a core material which is one of the constituents of a double structure, a W-based alloy in which fine particles are dispersed at a ratio of 0.5 to 10 volume % in total, the fine particles being one kind or two or more kinds of compounds selected from an oxide, a nitride, a carbide, and a boride of a 2A group element, a 4A group element, a 5A group element, a 6A group element, and a rare earth element, and the fine particles each having a melting point of 2,400° C. or higher and an average particle diameter of 2 μm or less.

Each of the electrodes maintains relatively high strength (high hardness) even under high temperatures, and have a double structure including the core material made of W, Mo, the W-based alloy, or the Mo-based alloy, which resists alloying reactions with plated metal, embedded in the electrode body made of Cu or the Cu alloy. The core material made of W, Mo, the W-based alloy, or the Mo-based alloy also easily ensures a current-carrying path of a certain size of area by being embedded in the electrode body; therefore, the lowering of welding current density can be suppressed, and an electrode having a longer lifetime can be aimed at.

W and Mo, which are originally hard materials, have been considered to have a defect in that, during spot welding, cracks are generated by impact at the time of pressing the electrode so that the W and Mo are easily broken. However, through a pinning action against crack development caused by the added fine particles, the generation and propagation of the cracks can be suppressed. By adding the fine particles, a large part of the core material does not break, enlargement of the current-carrying path is suppressed, and an approximately constant nugget diameter can be obtained. Owing to those effects, the lifetime of the electrode is improved to a large degree compared to that of a conventional electrode made of a Cu alloy.

Patent Document 1: Japanese Patent Laid-Open No. 2006-15349
Patent Document 2: Japanese Patent Laid-Open No. 2006-95549
Patent Document 3: Japanese Patent Laid-Open No. 2006-102775

DISCLOSURE OF THE INVENTION

Problems to be Solved by the Invention

However, even when an electrode has a double structure, there is a case where a long lifetime of the electrode cannot be stably obtained under a welding condition in which a calorific value is increased by increasing current-carrying current. Sometimes, at a stage before performing 10,000 welding spots, particle dropping/attrition and defects are caused in a distal end surface of the electrode, which may lead to the end of the lifetime thereof. That is, in a spot welding line aiming for high-speed mass production, the stability of the electrode is still insufficient, and frequent exchanges of the electrodes are unavoidable, which have caused productivity decline and rise in production costs.

The present invention has been made to solve the above problems. An object of the present invention is to provide an electrode for spot welding at a low cost, as an electrode for spot welding to which heat and pressure are applied repeatedly, which suppresses particle dropping/attrition and defects caused in a distal end surface of the electrode, has stably enhanced durability, and is embedded with a W- or Mo-based core material.

Means for Solving the Problems

In order to accomplish the above object, an electrode for spot welding according to the present invention has a double structure including Cu or a Cu alloy as an electrode body (ambient material) and a core material made of W, Mo, a W-based alloy, or a Mo-based alloy embedded in a surface of the electrode body which is abutted against a material to be welded. W, Mo, the W-based alloy, or the Mo-based alloy to be the core material include a structure extended in the electrode axis direction so that W, Mo, the W-based alloy, or the Mo-based alloy has a horizontal cross-sectional average particle diameter of 50 μm or more and an aspect ratio of 1.5 or more. In particular, a material in which a fibrous structure is arranged by subjecting W, Mo, the W-based alloy, or the Mo-based alloy to sintering, swaging, followed by annealing is preferred.

The hardness at room temperature of W or the W-based alloy is preferably in the range of HV 300 to 430. The hardness at room temperature of Mo and the Mo-based alloy is preferably in the range of HV 180 to 260.

In W, Mo, the W-based alloy, or the Mo-based alloy, one or more kinds of fine particles selected from oxides, nitrides, carbides, and borides of a 2A group element, a 4A group element, a 5A group element, a 6A group element, or a rare earth element may be dispersed. In the case of dispersing fine particles, it is preferable to disperse fine particles having an average particle diameter of 2 μm or less at a ratio of 0.5 to 10 mass % in total.

The core material is preferably embedded in the abutting surface, which is a surface of the electrode body to be abutted against a material to be welded, in such a manner that the area ratio of the core material to the abutting surface becomes 0.7 to 3.0.

By embedding the core material made of W, Mo, the W-based alloy, or the Mo-based alloy, reactivity with a plated metal and enlargement of the current-carrying path are suppressed, to thereby improve the lifetime of the electrode. The improvement effects are not only attained in electrodes for spot welding but are also the same in other resistance welding methods.

Effects of the Invention

The core material of a double structured electrode is preferably produced by subjecting W, Mo, the W-based alloy, or the Mo-based alloy to electric current sintering and swaging, and then molding the resultant into a predetermined shape, followed by subjecting the resultant to heat treatment. The heat treatment not only removes and releases residual stress which is introduced at the time of swaging, but also functions to make the aspect ratio of the crystal grains of the fibrous structure relatively small and make the horizontal cross-sectional average particle diameter of the crystal grains of the fibrous structure relatively large. By removing and releasing the residual stress through the heat treatment and by modifying the fibrous structure, stable durability is imparted to the electrode for spot welding.

BEST MODE FOR CARRYING OUT THE INVENTION

Figure 1:
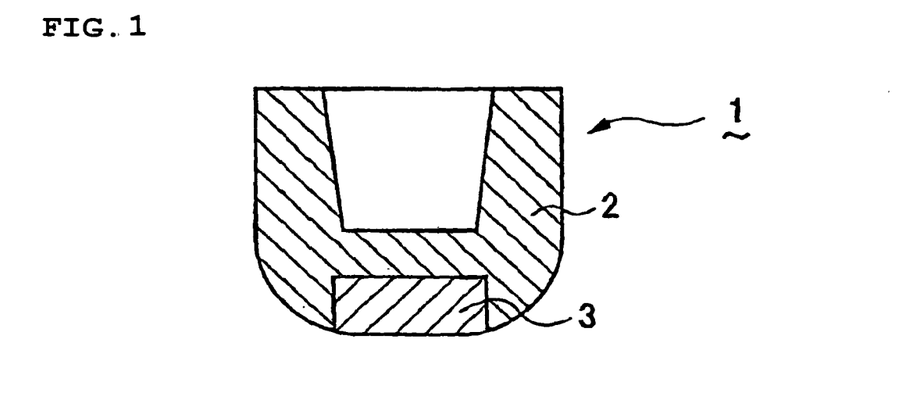
FIG. 1 is a view for explaining a structure of an embedded electrode having a double structure.

The inventors of the present invention intensively studied various causes of attrition and defects occurring in a distal end of an electrode at the time of spot welding by using a double structured electrode 1 (FIG. 1) in which a core material 3 made of W is embedded in an electrode body (ambient material) 2 made of a Cu alloy, and studied various countermeasures against the attrition and defects.

When attrition conditions of the distal end of the electrode at the time of welding are observed, in the distal end of the core material 3, particles on a distal end surface are dropped and the defects appears in the distal end (FIG. 2), because a cracks $c_1$ which extend from the distal end surface in an electrode axis direction connect with cracks $c_2$ which propagate radially.

Figure 2:
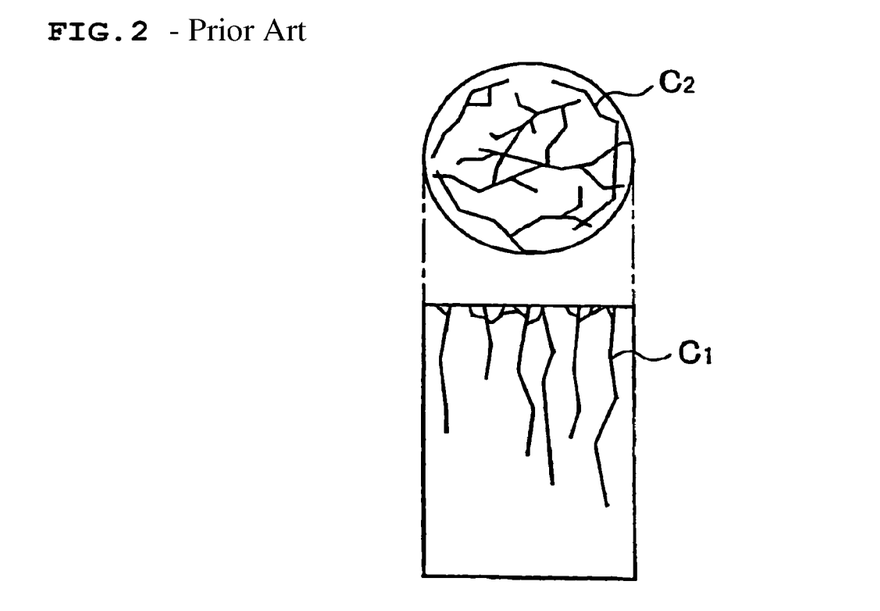
FIG. 2 is a schematic view for explaining attrition conditions of a distal end part of a core material in a conventional electrode.

A W rod to be used in the core material 3 is generally produced by electric current sintering and swaging, and has a fine fibrous structure. Further, the W rod is subjected to a hardening process during production; therefore, processing residual stress is present therein, which makes the W rod extremely hard. When the hardened W rode, is used as is as the core material 3, it is presumed that: stress is repeatedly applied to the distal end of the electrode under the same heating and pressing conditions as those at the time of welding; the stress is combined with the residual stress of the production process and cracks are generated from the initial stage of welding; and the cracks are gradually propagated.

For suppressing the attrition and defects in the distal end of the electrode, the propagation and connection of the cracks $c_1$ and $c_2$ must be suppressed. Accordingly, the fibrous structure formed inside the core material by swaging is modified into an effective structure for suppressing the connection of the cracks $c_1$ and $c_2$ by annealing (heat treatment), to thereby suppress generation of the cracks per se by removing the residual stress. The effect of the fibrous structure and the residual stress on the generation and propagation of the cracks is not limited to the double structured electrode having the core material made of W, but is also present in the double structured electrode having a core material made of Mo, a W-based alloy, or a Mo-based alloy.

Figure 3:
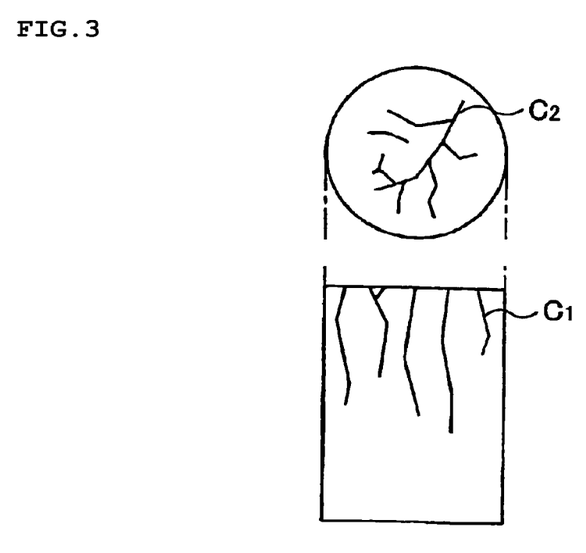
FIG. 3 is a schematic view for explaining attrition conditions of a distal end part of a core material in an electrode of the present invention.

In the fibrous structure generated by swaging, the propagation of the cracks in an electrode axis direction takes priority and the propagation in a radial direction is regulated. Then, when the fibrous structure is modified, by annealing after swaging, into a fibrous structure having a horizontal cross-sectional average particle diameter of 50 μm or more and an aspect ratio of 1.5 or more, the radial cracks $c_2$ decrease, whereby the chance of connection between the cracks $c_1$ extended in the electrode axis direction and the radial cracks $c_2$ becomes small (FIG. 3).

The residual stress of the metal material is generally removed by heat treatment such as annealing. In the case of the W rod to be used in the core material of the double structured electrode for spot welding, the generation of the cracks caused from the initial stage of welding can be suppressed when a rod material in which the residual stress thereof is removed by annealing after a hardening process is used as a raw material. In fact, in an electrode which uses an annealed W rod for the core material, the generation of cracks therein is decreased (FIG. 3).

The amount of residual stress can be approximately estimated from hardness at room temperature. For example, the hardness at room temperature of a cross section of the W rod being subjected to swaging of hardening processing is generally about HV 450, but the hardness after sufficient annealing decreases to less than about HV 300.

A detailed description of the hardness exhibiting appropriate annealing conditions will be given in the Examples to be mentioned later. In order to suppress the generation of the cracks caused from the initial stage of welding and to maintain the distal end shape as the core material of the double structured electrode, it is preferable to temper the core material in the range of HV 300 to 430 in the case of using W or a W-based alloy. When the hardness exceeds HV 430, reduction of the residual stress is insufficient, and cracks are likely to be generated in the distal end of the core material of the double structured electrode at a relatively earlier stage. On the contrary, when the core material is subjected to annealing to such an extent that the hardness thereof is below HV 300, the diameter of the distal end is enlarged during use as an electrode, which results in the lifetime of the electrode coming to an end in a relatively short period of time.

In a case where Mo or a Mo-based alloy is used as the core material of the double structured electrode, it is preferable to temper the core material in the range of HV 180 to 260 for the same reasons. Also, requisite characteristics other than the hardness can be deduced from the examples in which W or the W-based alloy is used for the core material.

Distribution conditions (metallographic structure) of crystal particles on a distal end surface of the core material also have a great effect, in addition to the processing residual stress, on the fact that the attrition occurs in the distal end of the core material of the double structured electrode at the time of welding.

When the metallographic structure is formed into the fibrous structure by swaging, the propagation direction of the cracks $c_1$ is directed to a perpendicular direction (electrode axis direction) which is effective for suppressing particle dropping, but large processing residual stress causes harmful effects. When the processing residual stress is removed by annealing, particle dropping suppressing action derived from the fibrous structure can be fully exhibited. However, when annealing is performed until the fibrous structure is completely lost and becomes a granular structure, the particle dropping occurs easily due to the propagation of the radial cracks $c_2$, which results in the attrition of the distal end of the core material increasing. The size of the crystal grains also increases when the annealing is performed; thus, conditions of the heat treatment need to be set in such a manner as to obtain appropriate annealing conditions.

A detailed description of appropriate structure conditions after annealing will be given in the Examples mentioned later. In order to suppress the attrition and defects of the core material, the ratio of major axis (L) to minor axis (S) of the particles maintaining the fibrous structure, i.e., an aspect ratio (L/S), must be 1.5 or more, and horizontal cross-sectional average particle diameter of each particle ($X_{average}$) must be 50 µm or more. When the aspect ratio (L/S) is less than 1.5, particle dropping in the distal end of the core material becomes likely to occur. When the horizontal cross-sectional average particle diameter ($X_{average}$) is less than 50 µm, particle dropping becomes likely to occur or electrical resistance increases, which results in the attrition of the core material becoming intense. The horizontal cross-sectional average particle diameter ($X_{average}$) can be determined from a microscope image obtained by observing a radial cross section of the core material of the electrode.

Grain boundary is apart where bonding strength between adjacent atoms across the grain boundary is weak, and when crystal particle diameter becomes smaller, the area of the grain boundary increases and the particles are more likely to drop off. In particular, in the case of W, Mo, a W-based alloy, or a Mo-based alloy, the effect of the crystal grain diameter becomes prominent when the horizontal cross-sectional average particle diameter is less than 50 µm, so the particles easily drop off by impact and electrical resistance becomes great. Therefore, the horizontal cross-sectional average particle diameter is preferably 50 µm or more, and ideally, a single crystal having no grain boundary is preferable.

When the core material is produced by swaging while heating, it is preferable that processing temperature be raised higher than the recrystallization temperature and to about the same temperature as a sintering temperature, and the use of a swaging jig heated to about the same temperature as the processing temperature is preferable. Grains of W or Mo grow by retention thereof at high temperatures, and the horizontal cross-sectional average particle diameter of W or Mo particles becomes large. However, swaging at high temperatures around the sintering temperature is difficult from the viewpoint of real operation, and the limit of the horizontal cross-sectional average particle diameter of W or Mo particle is 3 mm. When costs are emphasized, it is realistic that the upper limit of the horizontal cross-sectional average particle diameter is about 300 µm.

W and Mo are brittle materials that have a body-centered cubic lattice crystal structure and do not originally have malleability or ductility, and are difficult to plasticize. Even if the W or Mo material is treated at a temperature exceeding a brittleness-ductility transition temperature (about 400° C.), the material is cut halfway because W or Mo particles do not extend completely, and thus, the material cannot be treated only up to an aspect ratio of 50. In this respect, it is realistic that the treatment temperature be set low, and the upper limit of the aspect ratio is set to be about 20.

When a plated steel sheet is subjected to spot welding, using a double electrode in which a core material made of W, Mo, a W-based alloy, or an Mo-based alloy is embedded, W, Mo, the W-based alloy, or the Mo-based alloy may be alloyed with plated metal. If the alloying reaction proceeds, the distal end shape of the core material collapses, which shortens the lifetime of the electrode.

The alloying reaction with the plated metal can be suppressed by dispersing one or at least two kinds of fine particles selected from oxides, nitrides, carbides, and borides of 2A-group elements, 4A-group elements, 5A-group elements, 6A-group elements, and rare-earth elements in W, Mo, the W-based alloy, or the Mo-based alloy. These fine particles have less reactivity with Al and Zn, and exhibit the functions of decreasing the wettability of the core material made of W, Mo, the W-based alloy, or the Mo-based alloy with respect to the plated metal and suppressing the alloying reaction between the core material and the plated metal.

The dispersion of the fine particles is also effective for suppressing minute cracking that is likely to occur in the core material. That is, the propagation of cracking when the core material is shocked is pinned by the fine particles, so that cracking resistance and shock resistance are improved as a result. It is preferred that the fine particles have a particle diameter of 2 μm or less. When the particle diameter exceeds 2 μm, the fine particles may become the original point of destruction due to the thermal expansion difference between matrix and fine particles.

Although the effect of adding the fine particles is obtained in a dispersion amount of 0.5 mass % or more, an excess dispersion exceeding 10 mass % greatly decreases electric conductivity and increases the deposition amount of the plated metal at the distal end of the core material. Consequently, the electric resistance between the electrode and the material to be welded increases to make it difficult to supply a sufficient welding current to the material to be welded, so that it becomes difficult to continue stable continuous spot welding.

Figure 4:
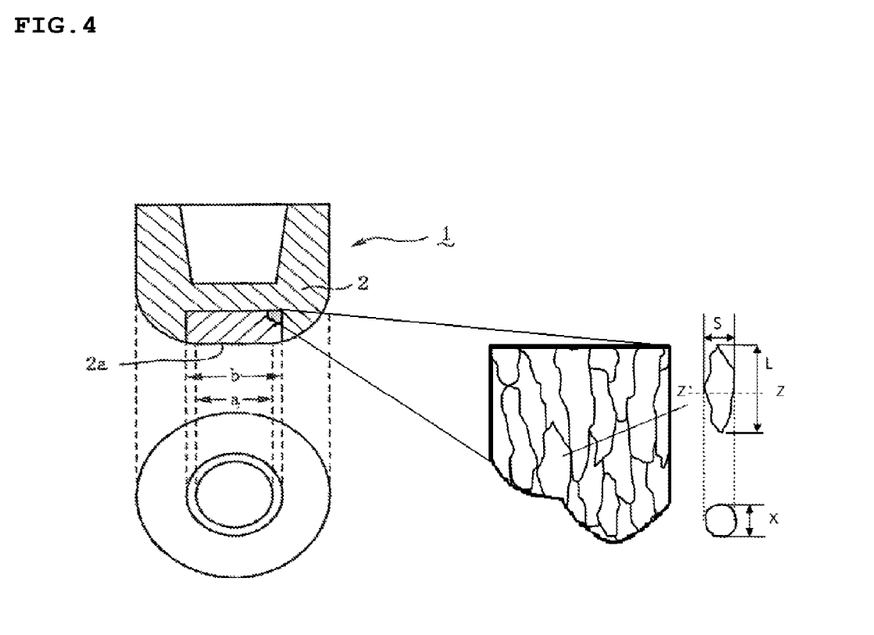
FIG. 4 is a view for explaining a relationship between an abutting surface and the core material in the electrode of the present invention.

It is preferred that the area ratio of the core material to the abutting surface in the electrode body and the core material of the present invention, i.e., the area ratio of the area represented by a diameter b of a core material 3 embedded in an ambient material 2 to an abutting surface 2a with respect to a material to be welded represented by a diameter a in an electrode 1 having a double structure as shown in FIG. 4 be 0.7 to 3.0. An area ratio exceeding 1.0 means that core material 3 with a diameter b larger than the diameter a of the abutting surface 2a is used, the electrode distal end including the core material 3 is ground, and the distal end shape is arranged so that the abutting surface is made of only the core material 3.

Cu or a Cu alloy used in the ambient material is more likely to be alloyed, compared with W, Mo, the W-based alloy, or the Mo-based alloy used in the core material. Thus, if the core material diameter b is larger than the diameter a of the abutting surface, Cu that is the ambient material does not come into contact with the plated metal, and the alloying reaction does not occur between Cu and the plated metal. When the core material area is smaller by about 30% than the area of the abutting surface, although the ambient material comes into contact with the plated metal, the deformation by the alloying between the ambient material and the plated metal does not enlarge the diameter due to a small contact area, so that the shape of the distal end portion is not deformed as the entire electrode.

If the area ratio exceeds 3.0, the cooling function of the core material by the ambient material becomes very small, and the plated metal is deposited in a large amount on the surface of the core material to increase the electric resistance between the electrode and the material to be welded too much, which makes it difficult to form a nugget. The further preferred range is 1.0 to 2.0.

Next, a method of producing an electrode for spot welding having a double structure will be described.

W, Mo, a W-based alloy, or an Mo-based alloy for a core material is produced by a sintering method, preferably an electric current sintering method. As a material for the electric current sintering, W or Mo doped with about 10 to 200 ppm of potassium (K) in the form of an oxide, a nitride, a metal, a carbide, or a boride is used in most cases, and in the present specification, "W, Mo, W-based alloy, or Mo-based alloy" that includes W or Mo doped with K is used.

Oxide powder or metal powder of W, Mo, the W-based alloy, or the Mo-based alloy with fine particles added thereto if required is heat-treated in a reducing atmosphere, and the heat-treated powder is formed into an appropriate shape, followed by provisional sintering and electric current sintering. Then, the sintered body is swaged and annealed into the shape of a bar.

In order to set a horizontal cross-sectional average particle diameter to be 50 μm or more in the case of producing a core material by swaging involving heating, for example, there are such method as a method in which the particles are grown to the horizontal cross-sectional average particle diameter in the vicinity of 50 μm in the first swaging step, and the horizontal cross-sectional average particle diameter is set to be 50 μm or more by the subsequent heat treatment at a recrystallization temperature or higher and a method in which even if the particle growth is not sufficient in swaging, the particles are grown by heat treatment in the later step to set the horizontal cross-sectional average particle diameter to 50 μm or more. Because factors such as temperature, pressure, and time act to impart recrystallization energy, it is preferred that hot isostatic pressing (HIP) be placed between the steps before and after swaging for effective particle growth to obtain a required particle diameter.

The aspect ratio of 1.5 or more can be achieved by heating the material to at least a ductility-brittleness transition temperature (about 400° C.) in the swaging step, and repeating several treatments with a treatment pressure applied to such a degree as not to cause brittle destruction.

Although the treatment residual stress introduced in the swaging is released and removed by annealing, heat treatment conditions of 1,400 to 3,000° C. for 1 second to 1 hour in a non-oxidizing atmosphere are preferred in W and the W-based alloy, and the heat treatment conditions of 980 to 2,100° C. for 1 second to 1 hour in a non-oxidizing atmosphere are preferred in Mo and the Mo-based alloy. The balance between the treatment temperature and the treatment time is effective for maintaining the aspect ratio of the core material and the horizontal cross-sectional average particle diameter in the respective defined value ranges.

When the treatment temperature is too low or the treatment time is too short, the treatment residual stress introduced during the swaging is not sufficiently released, and particle dropping cannot be avoided at the electrode distal end surface during use, which shortens the lifetime of the electrode. Further, although an aspect ratio of 1.5 or more is maintained, the recrystallization is unlikely to proceed, so that the horizontal cross-sectional average particle diameter of 50 μm or more cannot be achieved.

Conversely, at too high treatment temperatures and too long treatment times, the recrystallization of a fibrous structure introduced during the swaging is likely to proceed excessively. As a result, the aspect ratio becomes too small, and the horizontal cross-sectional average particle diameter becomes too large, so that the hardness decreases in turn, which shortens the lifetime of the electrode.

The bar-shaped W, Mo, W-based alloy, or Mo-based alloy after annealing is cut to a predetermined length to produce a core material of a double electrode.

As the ambient material surrounding the double electrode, generally, pure Cu, a Cu—Cu alloy, a Cu—Cr—Zr alloy, or the like is used.

The core material can be embedded in the ambient material made of Cu or a Cu alloy by various methods. For example, there are the following methods.

Method of press-fitting a core material in bored hole in an ambient material.

Method of inserting a core material into an ambient material via a wax material.

Method of embedding a core material to an ambient material by shrink fitting.

Method of cold-casting an ambient material cast-coated with a core material.

As long as the core material and the ambient material are in close contact with each other, the interface resistance of the core material/ambient material does not adversely affect the electric conduction and thermal conduction.

After an electrode structure with a double structure is formed, the distal end is formed into a required shape such as a DR shape by cutting or grinding.

Next, the present invention will be described specifically by way of examples with reference to the drawings.

EXAMPLES

Example 1

An electrode for spot welding with a double structure, which had a DR shape with a distal end diameter of 6 mm and an entire diameter of 16 mm and which was provided with an arc with a radius of curvature of 40 mm at a portion with the distal end diameter of 6 mm and an arc with a radius of curvature of 8 mm at other portions, was prepared by the following process.

W powder with a purity of 99.95% was subjected to electric current sintering and formed into a bar material with a diameter of 6 mm by swaging and centerless polishing. The bar material was annealed under varying heat treatment conditions of 1,400 to 3,000° C. for 1 second to 1 hour in a non-oxidizing atmosphere, whereby a plurality of core materials 3 with different structures and hardnesses were produced. Each of the obtained core materials 3 was embedded in an ambient material 2 made of pure Cu to obtain an electrode for spot welding.

A Zn-6% Al-3% Mg plated steel sheet with an adhesion amount per one side of 60 g/m$^2$ and a thickness of 0.7 mm was used as a material to be welded. Two materials to be welded were spot-welded at continuous spots under the conditions shown in Table 1 using the produced electrode for spot welding. The diameter of the formed nuggets was measured, and the point at which the diameter of the nuggets was below 4 $\sqrt{t}$=3.35 (t is a plate thickness) being set to be the lifetime of an electrode, the relationship between the lifetime of the electrode, the aspect ratio of the core material, horizontal cross-sectional average particle diameter, and hardness at room temperature was determined.

TABLE 1

| Continuous spot welding test condition | |
|---|---|
| Initial pressing time | 35 cycles |
| Energizing time | 12 cycles |
| Holding time | 1 cycle |
| Pressing force | 1.5 kN |
| Welding time | 2 seconds/spot (rest for 20 seconds after 20 spots) |
| Cooling water amount | 3 liters/min. for both upper and lower electrodes |

TABLE 1-continued

| Continuous spot welding test condition | |
|---|---|
| Welding current | Welding current of initial nugget diameter of 4.5 mm |

As is apparent from Table 2, in electrodes in which the heat treatment conditions were appropriate, the aspect ratio of a core material was 1.5 or more, and W with a horizontal cross-sectional average diameter of 50 μm or more was used for the core material, spot welding exceeding 10,000 welding spots was performed without any problem. The last column of Table 2 shows a comparative example that was subjected to swaging and centerless polishing but was not annealed.

On the other hand, the core material 3 that was annealed at too low a temperature or for too short a time did not have a horizontal cross-sectional average particle diameter of 50 μm or more while maintaining the aspect ratio of 1.5 or more. Thus, in the double electrode in which such a core material was embedded, particle dropping occurred at the distal end surface, and spot welding up to 10,000 welding spots was not performed. Conversely, at too high a treatment temperature or for too long a treatment time, there was a tendency for the aspect ratio to be too small and the horizontal cross-sectional average particle diameter was too large. When such a core material was used, the core material had low hardness and was greatly deformed, with the result that the desired lifetime of the electrode was not obtained.

In the present example, although a cylindrical core material was used, the same results were obtained even with a prismatic core material or a columnar core material.

TABLE 2

Relationship between aspect ratio and horizontal cross-sectional average particle diameter, and lifetime of electrode

| Aspect ratio | Horizontal cross-sectional average particle diameter (μm) | Hardness at room temperature (HV) | Electrode lifetime (spot) |
|---|---|---|---|
| 0.8 | 200 | 275 | 7,000 |
| 0.9 | 180 | 276 | 7,000 |
| 1 | 170 | 283 | 6,500 |
| 1.2 | 168 | 284 | 6,000 |
| 1.3 | 160 | 285 | 5,000 |
| 1.4 | 155 | 295 | 5,000 |
| 1.5 | 150 | 300 | ≧10,000 |
| 1.55 | 130 | 360 | ≧10,000 |
| 1.6 | 120 | 330 | ≧10,000 |
| 1.7 | 100 | 380 | ≧10,000 |
| 2 | 48 | 440 | 4,500 |
| 2 | 80 | 400 | ≧10,000 |
| 3 | 50 | 430 | ≧10,000 |
| 5 | 40 | 442 | 4,000 |
| 6 | 37 | 437 | 4,000 |
| 7 | 35 | 440 | 4,500 |
| 7.5 | 34 | 443 | 4,300 |
| 8 | 33 | 445 | 4,000 |
| 10 | 30 | 448 | 3,500 |
| 13 | 30 | 450 | 3,000 |

Example 2

An electrode for spot welding having a double structure in which a core material 3 made of Mo with the same size and shape as those in Example 1 was embedded was prepared by the following process.

Mo powder with a purity of 99.95% was subjected to electric current sintering and formed into a bar material with a diameter of 6 mm by swaging and centerless polishing. The bar material was annealed under varying heat treatment conditions of 980 to 2,100° C. for 1 second to 1 hour in a non-oxidizing atmosphere, whereby a plurality of core materials 3 with different structures were produced. Each of the obtained core materials 3 was embedded in an ambient material 2 made of pure Cu to obtain an electrode for spot welding.

The same Zn—Al—Mg alloy plated steel sheet as that of Example 1 was used as a material to be welded and subjected to spot welding at continuous spots under the conditions of Table 1, and the lifetime of an electrode was evaluated in the same way as in Example 1. Table 3 shows the evaluation results. The last column of Table 3 shows the results (comparative example) in which spot welding was performed with a double electrode in which a core material that was subjected to swaging and centerless polishing but was not annealed was embedded.

As is apparent from Table 3, in electrodes in which the heat treatment conditions were appropriate and the aspect ratio of a core material was 1.5 or more, and the core material made of Mo with a horizontal cross-sectional average diameter of 50 µm or more was embedded, spot welding exceeding 10,000 welding spots was performed without any problem.

On the other hand, the core material that was annealed at too low a temperature or for too short a time did not have a horizontal cross-sectional average particle diameter of 50 µm or more while maintaining the aspect ratio of 1.5 or more. Particle dropping occurred at the electrode distal end surface, and spot welding up to 10,000 welding spots was not performed. Conversely, the core material was annealed at too high a temperature or for too long a time, there was a tendency that the aspect ratio was too small and the horizontal cross-sectional average particle diameter was too large. When a double electrode with such a core material embedded therein was used for spot welding, the core material was deformed largely due to low hardness, with the result that the desired lifetime of the electrode was not obtained.

In the present example, although a cylindrical core material was used, the same results were obtained even with a prismatic core material or a columnar core material.

TABLE 3

Relationship between aspect ratio and horizontal cross-sectional average particle diameter, and lifetime of electrode

| Aspect ratio | Horizontal cross-sectional average particle diameter (µm) | Hardness at room temperature (HV) | Electrode lifetime (spot) |
|---|---|---|---|
| 1.0 | 220 | 170 | 6,300 |
| 1.1 | 198 | 170 | 6,300 |
| 1.2 | 187 | 172 | 5,400 |
| 1.3 | 176 | 175 | 4,500 |
| 1.4 | 185 | 175 | 5,400 |
| 1.4 | 171 | 178 | 4,500 |
| 1.8 | 165 | 180 | ≧10,000 |
| 1.9 | 143 | 190 | ≧10,000 |
| 2.0 | 110 | 200 | ≧10,000 |
| 2.4 | 88 | 220 | ≧10,000 |
| 2.4 | 48 | 266 | 4,100 |
| 3.6 | 55 | 260 | ≧10,000 |
| 6.0 | 44 | 269 | 3,600 |
| 7.2 | 41 | 265 | 3,600 |
| 8.4 | 39 | 265 | 4,000 |
| 9.0 | 37 | 268 | 4,000 |
| 9.8 | 36 | 268 | 3,600 |
| 12 | 33 | 272 | 3,200 |
| 13 | 30 | 270 | 2,600 |

Example 3

W in which a $CeO_2$ powder with a particle diameter of 0.5 µm was dispersed in various compounding ratios was used for a core material, and the influence of the content of the $CeO_2$ powder on the lifetime of an electrode was investigated.

Example 3 was the same as Example 1 except that the $CeO_2$ powder was contained in the core material, and the heat treatment of the core material was performed under the condition of 1,600° C. for 30 minutes, and an aspect ratio of 1.7, a horizontal cross-sectional average diameter of 100 µm, and a hardness at room temperature of HV 380 were set to be core material characteristics.

As is apparent from Table 4, under the condition that the content of the $CeO_2$ powder was 0.5 to 10 mass %, the improvement effect was observed at an electrode lifetime of 10,000 welding spots or more.

In contrast, even with the content of the $CeO_2$ powder of less than 0.5 mass %, the electrode lifetime electrode was 10,000 welding spots or more due to the effect of the aspect ratio and the horizontal cross-sectional particle diameter. However, plated metal was deposited at the distal end of the core material in a relatively large amount. Conversely, when the content of the $CeO_2$ powder exceeded 10 mass %, the function of improving the lifetime was lost. The reason for this is presumed to be as follows: the deposition amount of the plated metal on the electrode distal end increases, and the contact electric resistance of the electrode/material to be welded increases, with the result that a nugget is not formed sufficiently.

In the present example, although a cylindrical core material was used, the same results were obtained even with a prismatic core material or a columnar core material.

TABLE 4

Relationship between $CeO_2$ content and lifetime of electrode

| $CeO_2$ content (mass %) | 1 | 0.2 | 0.5 | 5.0 | 10 | 11 |
|---|---|---|---|---|---|---|
| Electrode lifetime (spot) | ≧10,000 | ≧10,000 | ≧10,000 | ≧10,000 | ≧10,000 | 3,000 |

Example 4

The lifetime of the electrode for spot welding was investigated, in which W with 1 mass % of fine particles having varying particle diameters and materials dispersed therein was used for a core material.

The characteristics of the core material and the lifetime of electrode were the same as those in Example 3.

As can be understood from the results shown in Table 5, in the case where fine particles with a particle diameter of 2 μm or less were dispersed in W, the electrode lifetime was prolonged remarkably. The improvement of the electrode lifetime was effective irrespective of the kind of the fine particles as long as compounds of 2A-group elements, 4A-group elements, 5A-group elements, 6A-group elements, or rare-earth elements were used.

Further, in the case where the particle diameter of $CeO_2$ fine particles was changed in the range of 0.5 to 3 μm, the improvement effect of electrode lifetime was observed at the particle diameter of 2 μm or less.

In the present example, although a cylindrical core material was used, the same results were obtained even with a prismatic core material or a columnar core material.

TABLE 5

Relationship between kind and particle diameter of added fine particles, and electrode lifetime

| Kind of additive | Particle diameter (μm) | Electrode lifetime (spot) |
| --- | --- | --- |
| SrO | 1 | ≧10,000 |
| $CeO_2$ | 1 | ≧10,000 |
| $CeO_2$ | 0.5 | ≧10,000 |
| $CeO_2$ | 2 | ≧10,000 |
| $CeO_2$ | 3 | 3,000 |
| WC | 1 | ≧10,000 |
| $ZrB_2$ | 1 | ≧10,000 |
| ZrN | 1 | ≧10,000 |
| TiN | 1 | ≧10,000 |
| $TiB_2$ | 1 | ≧10,000 |

Example 5

The influence of an area ratio of a core material/an abutting surface on the electrode lifetime was investigated by varying the core material diameter of the core material made of W.

The same conditions as those in Example 1 were used except that the core material diameter was varied, and the heat treatment of the core material was performed under the condition of 1,600° C. for 30 minutes, and an aspect ratio of 1.7, a horizontal cross-sectional average diameter of 100 μm, and a hardness at room temperature of HV 380 were set to be core material characteristics.

As is apparent from the results shown in Table 6, in the electrodes in which the core materials were embedded so that the area ratio of the core material to the abutting surface was 0.7 to 3.0, change in the distal end shapes of the electrodes was slight, and spot welding exceeding 10,000 welding spots was performed.

TABLE 6

Relationship between area ratio of core material to abutting surface and lifetime of electrode

| Core material diameter (mm) | Area ratio of core material to abutting surface | Electrode lifetime (spot) |
| --- | --- | --- |
| 5 | 0.7 | 10,000 or more |
| 6 | 1.0 | 10,000 or more |
| 7 | 1.36 | 10,000 or more |
| 8 | 1.78 | 10,000 or more |
| 10 | 2.78 | 10,000 or more |

Example 6

W in which a $CeO_2$ powder with a particle diameter of 0.5 μm was dispersed at 1 mass % was used for a core material, and the influence of an area ratio of core material to abutting surface on the lifetime of an electrode was investigated.

The same conditions as those in Example 5 were used except that the $CeO_2$ powder was included in the core material.

As is apparent from the results shown in Table 7, when fine particles were included in the core material, in the electrodes in which the core materials were embedded so that the area ratio of the core material to the abutting surface was 0.7 to 3.0, change in the distal end shapes of the electrodes was slight, and spot welding exceeding 10,000 welding spots was also performed.

TABLE 7

Relationship between area ratio of core material to abutting surface in which $CeO_2$ is dispersed and lifetime of electrode

| Core material diameter (mm) | Area ratio of core material to abutting surface | Electrode lifetime of (spot) |
| --- | --- | --- |
| 5 | 0.7 | 10,000 or more |
| 6 | 1.0 | 10,000 or more |
| 7 | 1.36 | 10,000 or more |
| 8 | 1.78 | 10,000 or more |
| 10 | 2.78 | 10,000 or more |

INDUSTRIAL APPLICABILITY

As described above, an electrode for spot welding of the present invention has a double structure in which W, Mo, a W-based alloy, or an Mo-based alloy having a fibrous structure with a horizontal cross-sectional average particle diameter of 50 μm or more and an aspect ratio of 1.5 or more is used as a core material and embedded in an ambient material made of Cu or a Cu alloy. Due to the fibrous structure, the propagation direction of cracks is regulated in the electrode axis direction, and the particle dropping at the electrode distal end surface is suppressed. Therefore, even at continuous spots exceeding 10,000, nuggets with a sufficient size can be formed, with the result that the electrode for spot welding of the present invention is used as an electrode with a long lifetime.

The invention claimed is:

1. An electrode for spot welding, which has a double structure comprising:
  an electrode body made of Cu or a Cu alloy; and
  a core material made of W, Mo, a W-based alloy, or a Mo-based alloy embedded in an abutting surface, which is a surface of the electrode body abutted against a material to be welded, wherein W, Mo, the W-based alloy, or the Mo-based alloy forming the core material comprises a fibrous structure extended in an electrode axis direction so that each crystal grain of the W, Mo, the W-based alloy, or the Mo-based alloy has a horizontal cross-sectional average particle diameter of 50-300 μm and an aspect ratio of 1.5 or more.

2. The electrode for spot welding according to claim 1, wherein the fibrous structure formed in W, Mo, the W-based alloy, or the Mo-based alloy by swaging is adjusted, by annealing, to have the horizontal cross-sectional average particle diameter of 50-300 μm or more and the aspect ratio of 1.5 or more.

3. The electrode for spot welding according to claim 1, wherein the core material is made of W or the W-based alloy having a hardness at room temperature of HV 300 to 430.

4. The electrode for spot welding according to claim 1, wherein the core material is made of Mo or the Mo-based alloy having a hardness at room temperature of HV 180 to 260.

5. The electrode for spot welding according to claim 1, wherein the core material is made of W, Mo, the W-based alloy, or the Mo-based alloy in which at least one fine particle selected from an oxide, a nitride, a carbide, and a boride of a 2A group element, a 4A group element, a 5A group element, a 6A group element, and a rare earth element are dispersed at a ratio of 0.5 to 10 mass %.

6. The electrode for spot welding according to claim 5, wherein the at least one fine particle dispersed in the core material has an average particle diameter of 2 μm or less.

7. The electrode for spot welding according to claim 1, wherein the core material is embedded in the abutting surface so that an area ratio of the core material to the abutting surface becomes 0.7 to 3.0.

* * * * *